(12) United States Patent
Cantenot et al.

(10) Patent No.: US 7,643,506 B2
(45) Date of Patent: Jan. 5, 2010

(54) METHOD FOR BROADCASTING EXTENSIVE MULTICAST INFORMATION, SYSTEM AND CORRESPONDING SOFTWARE PRODUCT (75) Inventors: Noel Cantenot, Palaiseau (FR); Luc Beloeil, Douvres-la-Delivrande (FR); Sebastien Auvray, Caen (FR)

(73) Assignee: France Telecom, Paris (FR)

( * ) Notice: Subject to any disclaimer, the term of this patent is extended or adjusted under 35 U.S.C. 154(b) by 626 days.

(21) Appl. No.: 10/567,751

(22) PCT Filed: Aug. 2, 2004

(86) PCT No.: PCT/FR2004/002074

§ 371 (c)(1),
(2), (4) Date: Feb. 10, 2006

(87) PCT Pub. No.: WO2005/018198

PCT Pub. Date: Feb. 24, 2005

(65) Prior Publication Data

US 2006/0291465 A1   Dec. 28, 2006

(30) Foreign Application Priority Data

Aug. 12, 2003 (FR) .................................. 03 09873

(51) Int. Cl.
*H04L 12/28* (2006.01)
*H04L 12/56* (2006.01)
(52) U.S. Cl. .................. 370/432; 370/351; 370/389
(58) Field of Classification Search .................. 370/351, 370/389, 395.1, 398, 399; 398/43, 36
See application file for complete search history.

(56) References Cited

U.S. PATENT DOCUMENTS

| 6,259,724 B1 * | 7/2001 | Esmailzadeh ................ 375/143 |
| 6,961,319 B2 * | 11/2005 | Novaes ........................ 370/256 |
| 6,988,146 B1 * | 1/2006 | Magret et al. ................ 709/238 |
| 7,171,198 B2 * | 1/2007 | Paila et al. ................ 455/432.1 |
| 2003/0012216 A1 | 1/2003 | Novaes |

OTHER PUBLICATIONS

Meyer D: "Request for Comments 2365: Administratively Scoped IP Multicast", Network Working Group, 'Online! Jul. 1, 1998, XP002274123, Retrieved from the Internet: URL:http://www.faqs.org/rfcs/rfc2365.html> retrieved on Mar. 17, 2004, paragraph 0003-paragraph 0006.

* cited by examiner

*Primary Examiner*—Chi H Pham
*Assistant Examiner*—Fan Ng
(74) *Attorney, Agent, or Firm*—Young & Thompson (57) ABSTRACT

A method for broadcasting extensive multicast from a multicast exchange having a first address of a site of origin. A query of extensive multicast broadcasting containing the first address and an identification code of a mobile terminal is transmitted from the mobile terminal toward the site. A message offering access containing a second global multicast broadcasting address, whose source is situated in the site of origin, is transmitted from the site toward the mobile terminal. A message accepting access is transmitted from the mobile terminal toward the site upon the broadcasting to the second address. Information to be diffused is transferred from the first to the second address, and global multicast is transmitted by broadcasting to the second address. The mobile terminal receives, at the distinct site, the information diffused under the first address diffused under the second address.

18 Claims, 7 Drawing Sheets

FIG.3a request message

FIG.3b message offering access

FIG.3c message accepting the
offer of access

METHOD FOR BROADCASTING EXTENSIVE MULTICAST INFORMATION, SYSTEM AND CORRESPONDING SOFTWARE PRODUCT

CROSS-REFERENCE TO RELATED APPLICATIONS

The present application claims priority to and incorporates by reference PCT/FR2004/002074 filed Aug. 2, 2004 and French Application No. 0309873 filed Aug. 12, 2003.

STATEMENT REGARDING FEDERALLY SPONSORED RESEARCH OR DEVELOPMENT

None.

THE NAMES OF THE PARTIES TO A JOINT RESEARCH AGREEMENT

None.

INCORPORATION-BY-REFERENCE OF MATERIAL SUBMITTED ON A COMPACT DISC

None.

BACKGROUND OF THE INVENTION

1. Field of the Invention

The invention relates to an extended multicast information broadcasting method, a system and corresponding software products.

2. Description of Related Art

At the present time, businesses or industrial or commercial companies are virtually compelled to transfer data and information supported by this data via the IP network.

Most commonly, these businesses or companies are multi-establishment entities, with one or more establishments normally being associated with at least one website, these sites being interlinked via an IP network. These businesses or companies are therefore also multi-site entities.

As a general rule, the IP multicast information broadcasting process can be used for information broadcasts on each of the abovementioned sites.

However, the abovementioned broadcasts are said to be "private", because they are limited and restricted to users of fixed or roaming terminals identified as belonging to the site, but cannot in any way be transmitted from one site to another.

This type of broadcast is, for this reason, called a broadcast local to the site.

A review of the unicast and multicast broadcasting techniques is given first of all below, in conjunction with the figures.

Figure 1A:
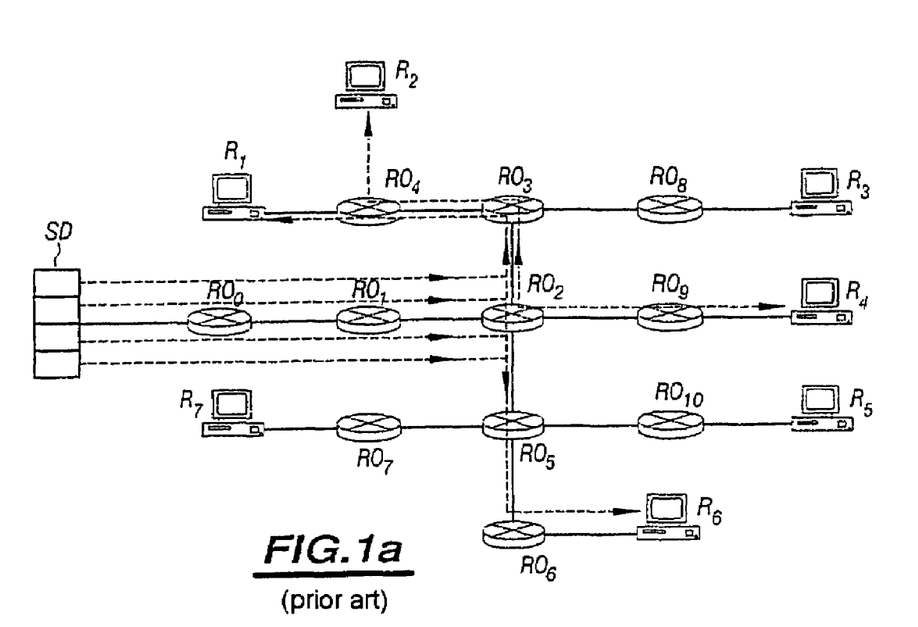

With reference to FIG. 1a, the unicast broadcasting technique currently used on the IP network supports point-to-point broadcasts.

A broadcast server SD generates a flow of data to each of the terminals (receivers) $R_1$ to $R_7$, for which it has received a request via routers $RO_0$ to $RO_{10}$.

The more receivers there are, the more the SD server is polled and the more network bandwidth is used to transmit identical data and information.

Figure 1B:
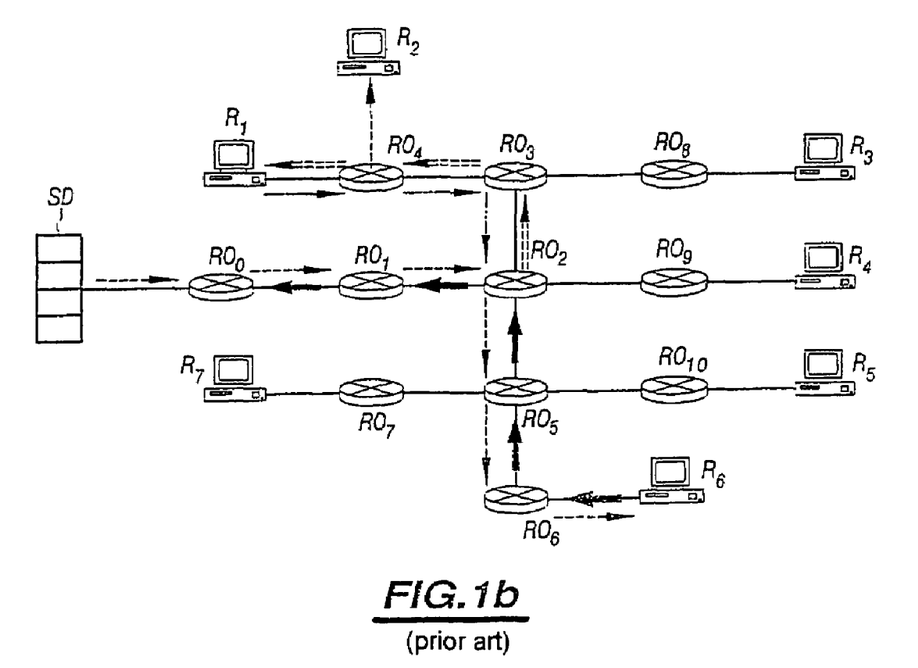
Figure 1C:
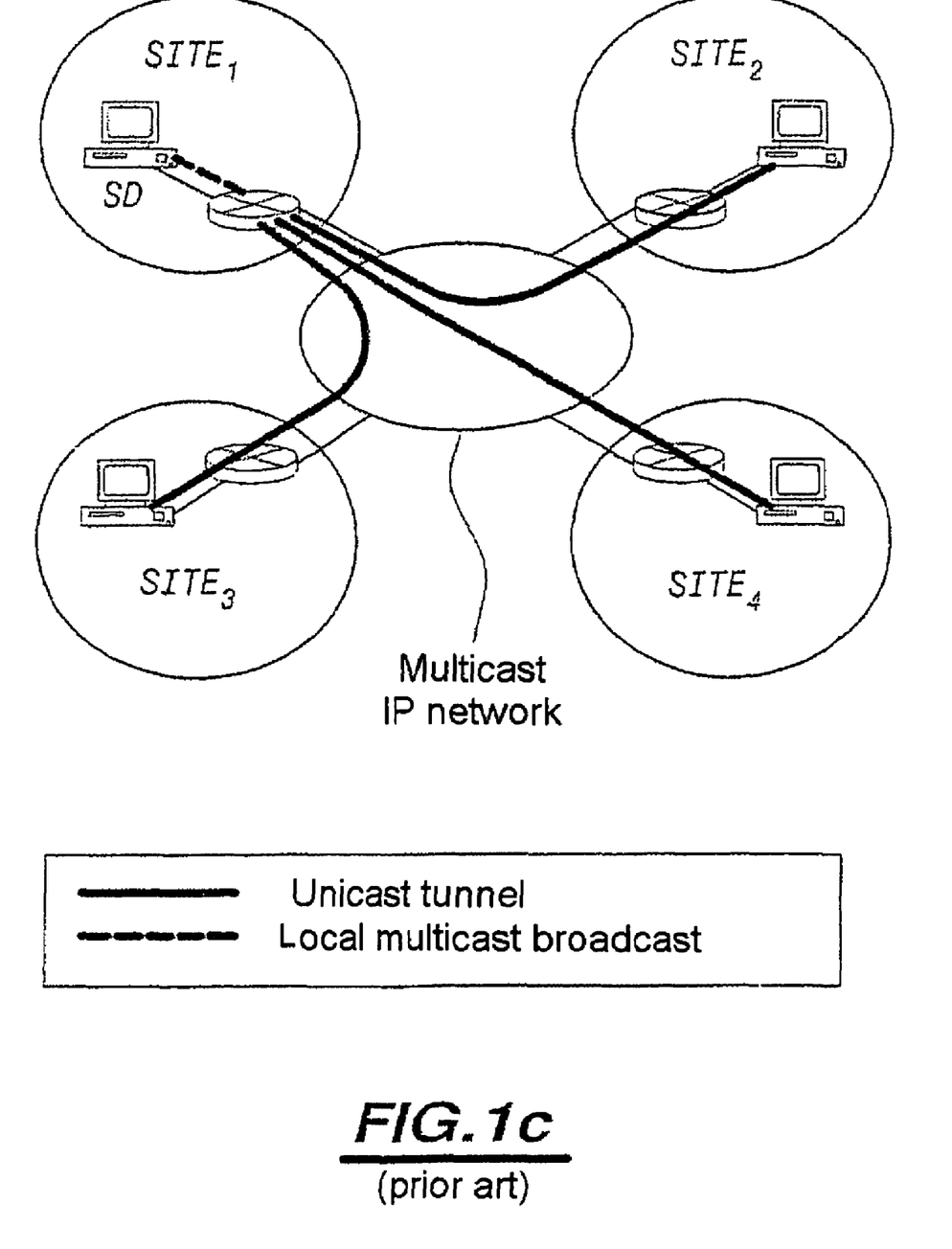

In the case of the multicast broadcasting technique, however, with reference to FIGS. 1b and 1c, a receiver, $R_6$, wishing to have access or subscribe to a multicast broadcast sends an access request to its access router $RO_6$, according to the IGMP method (RFC 2236). The access router $RO_6$ uses a multicast routing protocol, the PIM-SM method (RFC 2117) for example, to relay this request to a point in the network (switching point or router) that is already receiving this broadcast, possibly directly to the access router $RO_0$ of the broadcasting source, as is represented in FIG. 1b. The route of the abovementioned request is represented by solid line arrows in FIG. 1b.

Each router belonging to the path keeps in memory the software interface, the routing address data, via which it has received a request to subscribe to a determined broadcast. When the router concerned receives the IP data packets relating to this broadcast, it transmits them to its adjacent router by reverse path, via the stored software interface.

Thus, the IP data packets corresponding to this broadcast reach the requesting receiver $R_6$ by reverse path. The reverse path is represented by broken line arrows in FIG. 1b.

When a new receiver, receiver $R_1$ for example as represented in FIG. 1b, wants to access this same broadcast, it sends its access request to its access router $RO_4$. The latter transmits this request until it reaches a router executing the requested broadcast, in this case the router $RO_2$ in FIG. 1b. The path of this request is represented by alternating solid and broken line arrows in FIG. 1b.

The router that is furthest forward, in the broadcast direction, reached by this request, which is already receiving the broadcast data and information requested by the receiver $R_1$, stops this request from being returned to the broadcasting source, the server SD, duplicates the IP data packets to transmit the latter also to the receiver $R_1$ via the stored software interface, by reverse path. The path of the complete broadcast is represented by broken line arrows in FIG. 1b, the reverse path $RO_2$-$RO_3$-$RO_4$-$R_1$ being represented by double broken line arrows, although belonging to the same multicast broadcast as that requested by the receiver $R_6$. The same applies for any other receiver $R_2$ to $R_5$ likely to request the same broadcast.

Consequently, with the IP multicast broadcasting technique, it can be seen that the server SD sends the data supporting the information forming the broadcast only once. This data is duplicated by the routers of the network dynamically, to reach the authorized receivers that have requested it. The set of routes or paths taken by the IP data packets of the broadcast, from the server SD to these authorized receivers, forms a multicast information broadcast tree, the root of which is the broadcasting source, server SD or root router $RO_0$, the various paths forming the branches and the terminal receivers forming the leaves. It will be understood, in particular, that, following the access request from the receivers $R_6$ and $R_1$, in the case of an access request from the receiver $R_4$, the branch $RO_2$-$RO_9$ and receiver leaf $R_4$ are added whereas in the case of an access request from the receiver $R_2$, only the receiver leaf $R_2$ is added.

Regarding the IP multicast addressing, the multicast broadcasting technique introduces the concept of multicast broadcast. An IP data packet that is part of a multicast broadcast has a destination IP address, called a multicast address. All the data packets supporting information belonging to one and the same broadcast have the same destination multicast address. Whereas a unicast IP address is used to identify only a single receiving machine or terminal, a multicast IP address is used to identify a set or group of machines, the set of authorized machines with access to this broadcast. A multicast address is therefore always a destination address and is pointless as a source address. To this end, a portion of the IP address codes is reserved for the assignment of multicast addresses.

Specifically, the RFC 2365 standard (Administratively Scoped IP Multicast) defines a way of assigning to certain multicast addresses an administrative limit on the broadcast that these addresses represent.

Depending on the value of the multicast address assigned to a broadcast, this broadcast is consequently intended to be limited:
- to a site ("site-local scope");
- to an organization ("organization-local scope");
- to the entire Internet ("global scope").

The data supporting an information broadcast limited to a site, "site-local scope", must not cross the administrative limits that are imposed on it by its multicast address. To this end, each administrative entity is responsible for the configuration of its routers so as to handle the translation, in terms of network configuration on this site, of above-mentioned administrative rules and compliance with the latter.

The possibilities offered by the above-mentioned multicast broadcast concept with a view to the broadcasting of data to the different sites of a multi-site business or entity at the present time appear to be substantially limited.

If, with reference to FIG. 1c, we assume a multi-site entity located on four separate sites, site 1, site 2, site 3 and site 4, site 1 for example including a multicast broadcast server SD, such a broadcast, according to a "site-local scope" mode, is local to the site 1. Consequently, the IP data packets supporting the information of this broadcast are not transmitted outside the site. These data packets do not therefore pass through the interconnecting network and cannot be received by the users of the other sites, site 2, site 3, site 4.

One possibility could be, where appropriate, to implement a unicast IP tunnel between the site 1, the originating site, and each of the users, in particular the roaming users connected to the other sites, site 2, site 3 and site 4.

Although an appropriate signaling can be used to allow the routing of requests to access the broadcast, respectively of the data packets supporting the information of this broadcast by reverse path via each of the unicast IP tunnels, the drawbacks generated by such a solution are as follows:
- loss of all the benefits associated with the multicast broadcast over the network interconnecting the sites, precisely because of the creation of substitute unicast IP tunnels;
- scaling problem: the more requesting users there are, the more it is necessary to create unicast tunnels, and the more, consequently, the access router $RO_0$ of the site 1 has to duplicate the IP packets supporting the information of the broadcast and the more the bandwidth on the interconnecting network is used to transmit the same data packets multiple times. Such a method is therefore analyzed, from the point of view of the bandwidth consumption of the connecting network, as a simple multiplication of point-to-point connections, which consequently limits the number of simultaneous requesting users on all the sites of the multi-site entity.

BRIEF SUMMARY OF THE INVENTION

The object of the present invention is to overcome the drawbacks of the possibilities directly deriving from the conventional multicast broadcast and the connection by unicast IP tunnel, by recognizing the intrinsic potential of multicast broadcasting over the network interconnecting the multiple sites of a multi-site entity or business, in order to allow the broadcasts local to any site to be broadcast to the requesting users, such as the roaming users belonging to this site and visiting other sites of the multi-site entity, while avoiding the creation of multiple unicast IP tunnels.

Another object of the present invention is, furthermore, to avoid any duplicating of the data packets supporting the information of the broadcast in proportion to the number of unicast IP tunnels or users requesting this broadcast on the sites that make up this multi-site entity.

The final object of the present invention is to provide an optimization of the resources of the interconnecting network through the abovementioned absence of duplication, the service for accessing the local broadcast on an originating site still remaining operational whatever the number of requesting users, such as one of the roaming users visiting the separate sites, other than the originating site, that make up the multi-site entity.

The abovementioned objects are achieved, through the implementation of an extended multicast information broadcasting method, based on a multicast information broadcast, a system and corresponding software products, the concept of extended multicast information broadcast corresponding to that of a multicast broadcast that is global, yet limited to the set of sites that make up a multi-site business or entity.

The multicast information broadcasting method extended, from a local multicast broadcast on an originating site to a roaming terminal user belonging to this originating site, to at least one separate site hosting this roaming terminal and linked to this originating site by the IP network, this local multicast information broadcast being generated from an information broadcasting source located at a first local multicast information broadcasting address in this originating site, in accordance with the object of the present invention, is noteworthy in that it consists, after interconnecting this roaming terminal to the IP network on this separate site, in transmitting, from the roaming terminal to the originating site, an extended IP multicast information broadcast request message, this request message containing at least this first local multicast broadcasting address and an identification code of this roaming terminal, and, following the identification of said roaming terminal by this originating site, transmitting from this originating site to this roaming terminal a message offering access to a global multicast information broadcast, this message offering access including at least one second global multicast information broadcasting address, the broadcasting source of which is identified in this originating site, and, following the receipt of this message offering access by this roaming terminal, transmitting from this roaming terminal to the originating site, via the IP network, a message accepting the offer to access the information being broadcast at this second global multicast information broadcasting address, and, at the originating site, transferring the information to be broadcast from the first to the second address, and transmitting, by global multicast broadcast, the information to be broadcast to the second address.

This enables the roaming terminal interconnected on the separate site to receive, on this separate site, the information being broadcast under the first local broadcasting address, broadcast under the second global broadcasting address.

The multicast information broadcasting system extended, from a local multicast broadcast on an originating site to a roaming terminal user belonging to this originating site, to at least one separate site hosting this roaming terminal and linked to this originating site by the IP network, the local multicast information broadcast being generated, from an information broadcasting source located at a first local multicast broadcasting address in this originating site, in accordance with the object of the present invention, is noteworthy in that it includes at least, at this originating site, a module for receiving an extended IP multicast information broadcast request message, sent by this roaming terminal from this separate site, this request message containing at least this first local multicast information broadcasting address and an identification code of this roaming terminal, this reception module being used for the identification of this roaming terminal by the originating site, a module for transmitting, from the originating site to the roaming terminal, a message offering access to a global multicast information broadcast, this message offering access including at least one second global multicast information broadcasting address, the broadcasting source of which is identified in the originating site, a module for receiving a message accepting the offer of access to the information being broadcast at this second global multicast information broadcasting address sent by this roaming terminal, a module for transferring the information to be broadcast from the first to the second broadcasting address and a module for the transmission, by global multicast information broadcast, of the information to be broadcast under the second address.

The invention further relates to a roaming terminal equipped to implement the multicast information broadcasting method extended, from a local multicast information broadcast on an originating site, to which this roaming terminal belongs, to at least one separate site hosting this roaming terminal and linked to this originating site by the IP network, from an information broadcasting source located at a first local multicast information broadcasting address in this originating site. This roaming terminal is noteworthy in that it includes at least, stored in the mass memory of the latter, a software module for creating and transmitting an extended IP multicast information broadcast request message, this request message containing at least a first multicast information broadcasting address and an identification code of this roaming terminal, a software module for receiving and reading a message offering access to a global multicast information broadcast, this message offering access including at least one second global multicast information broadcasting address, the broadcasting source of which is identified in the originating site and a software module for creating and transmitting to this originating site via the IP network, a message accepting the offer of access to the information being broadcast at this second global multicast information broadcasting address.

The extended multicast information broadcasting method and system that are the subject of the present invention find application in the management of and controlled access to local and global multicast information broadcasts between the various sites of establishments or multi-site businesses interconnected by the IP network.

BRIEF DESCRIPTION OF THE SEVERAL VIEWS OF THE DRAWINGS

They will be better understood from reading the description and looking at the drawings below, in which, apart from FIGS. 1a to 1c concerning the prior art of the unicast and multicast information broadcasting techniques.

DETAILED DESCRIPTION OF THE INVENTION

The multicast information broadcasting method extended, from a local multicast information broadcast on an originating site to a roaming terminal user belonging to that originating site, to at least one separate site hosting this roaming terminal and linked to this originating site by the IP network, in accordance with the subject of the present invention, will now be described in conjunction with FIG. 2a and the following figures.

As a general rule, it should be remembered that the local multicast information broadcast denoted $LMD_{oi}$ is generated from an information broadcasting source SD intended for a first local multicast information broadcasting address in this originating site.

Figure 2A:
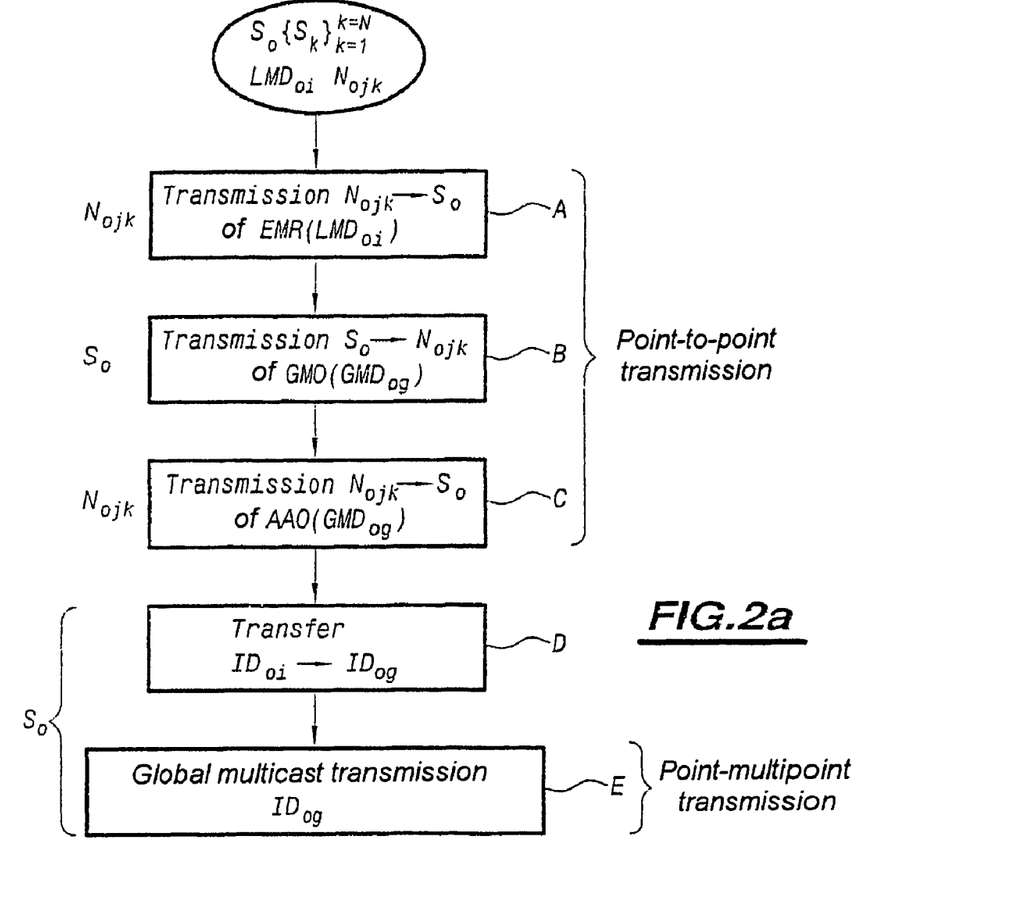
FIG. 2a represents, by way of illustration, a flow diagram of the main steps in implementing the extended multicast information broadcasting method, according to the object of the present invention.

With reference to FIG. 2a, the local multicast information broadcast is designated $LMD_{oi}$, in which the references 0 and i represent the first local multicast information broadcasting address in this originating site, the reference 0 designating the address of the originating site $S_0$ and the reference i designating the address of the local multicast information broadcast concerned in the abovementioned originating site. The local multicast information broadcast can be given equivalent status to the first broadcasting address.

A set of separate sites $\{S_k\}$, k=1 to k=N, is also considered, the originating site $S_0$ and each of the sites $S_k$ forming the multi-site entity or business mentioned previously in the description.

Finally, there is assumed a roaming terminal denoted $N_{0jk}$, the index 0 indicating a reference to the effect that this roaming terminal belongs to the originating site $S_0$, the reference j denoting a reference or identification code of the roaming terminal concerned and the reference k denoting the connection of the roaming terminal concerned to the separate site $S_k$ hosting the latter and the link from the roaming terminal concerned to the originating site via the IP network.

With reference to FIG. 2a, the method that is the subject of the invention consists, via the interconnection of the roaming terminal to the IP network, in transmitting, in a step A, from the roaming terminal $N_{0jk}$ to the originating site $S_0$, an extended multicast information broadcast request message, this request message being denoted EMR ($LMD_{0i}$).

As is indicated in the step A of FIG. 2a, the abovementioned request message contains at least the first local multicast information broadcasting address $LMD_{0i}$, and an identification code of the roaming terminal based in particular on the indices 0 and references j and k of the roaming terminal concerned $N_{0jk}$.

Following the identification of the roaming terminal by the originating site based on the information contained in the request message, the method that is the subject of the invention consists, in a step B, in transmitting from the originating site $S_0$ to the roaming terminal $N_{0jk}$, a message offering access to a global multicast information broadcast, this message offering access being denoted GMO ($GMD_{0g}$) in FIG. 2a. The abovementioned message offering access includes at least one second global multicast information broadcasting address $GMD_{0g}$, the broadcasting source of which is identified in the originating site.

With reference to FIG. 2a and step B of the latter, it will be understood that the second global multicast information broadcasting address $GMD_{0g}$ includes the reference with the index 0 relating to the originating site and the reference g to a global multicast broadcasting address as defined specifically according to the RFC2365 standard mentioned previously in the description.

Following the receipt of the message offering access GMO ($GMD_{0g}$) by the roaming terminal $N_{0jk}$, the method that is the subject of the invention then consists, in a step C, in transmitting from the abovementioned roaming terminal to the originating site $S_0$ via the IP network, a message accepting the offer of access to the information being broadcast at the second global multicast information broadcasting address.

In the step C of FIG. 2a, the message accepting the offer of access is denoted AAO ($GMD_{0g}$). After receipt of the message accepting the offer of access AAO ($GMD_{0g}$) at the originating site $S_0$, the method that is the subject of the invention includes a step D consisting in transferring the information to be broadcast, stored at the first broadcasting address and denoted for this reason $ID_{0i}$, to the second broadcasting address. The information stored under the second broadcasting address being denoted $ID_{0g}$.

By this simple operation, the information broadcast according to a local multicast information broadcast on the originating site $S_0$ can then be broadcast according to an extended multicast information broadcast via the following step E represented in FIG. 2A.

The abovementioned step E then consists in transmitting, by global multicast broadcast, the information to be broadcast under the second address $ID_{0g}$. This enables the roaming terminal $N_{0jk}$ interconnected on the separate site to receive on the abovementioned separate site $S_k$ information broadcast under the first local broadcasting address then broadcast under the second global broadcasting address.

With reference to the same FIG. 2a, it is indicated that the steps A, B and C represented in the latter, concerning the transmission between the roaming terminal $N_{0jk}$ and the originating site $S_0$ of the extended IP multicast broadcast request message EMR ($LMD_{0i}$), of the message offering access to a global multicast broadcast GMO ($GMD_{0g}$) and of the message accepting the offer of access AAO ($GMD_{0g}$) are executed in point-to-point mode.

The execution of this transmission mode for the abovementioned steps is made possible through the communication of the respective addresses 0 of the originating site or k of the separate site concerned, the index j or address reference of the roaming terminal possibly then consisting of an identification code of the latter.

However, and according to a noteworthy aspect of the method that is the subject of the present invention, the global multicast transmission step E is performed in point-multipoint mode.

It will be understood, in these conditions, that the process for transmitting information broadcast under the second address, the global multicast transmission in the step E, is then comparable to the one described in conjunction with FIG. 1b described previously in the description, but that, however, the transmission of the information broadcast under the second global multicast broadcasting address $ID_{0g}$ is no longer performed locally on only the originating site, but also on the or each separate site of the multi-site entity, as will be described in greater detail later in the description.

A particular embodiment of the step D consisting in transferring the information to be broadcast from the first to the second broadcasting address will now be described in conjunction with FIG. 2b.

The abovementioned embodiment concerns the particular and non-limiting case in which the originating site S0 includes a broadcast server SD connected to the IP network via a router denoted $RO_0$, for example. This particular case advantageously corresponds to the situation of a multi-site business for which one of the originating sites $S_0$ is provided with a broadcast server SD with a large number of customers, the use of a router in this situation being preferable.

Figure 2B:
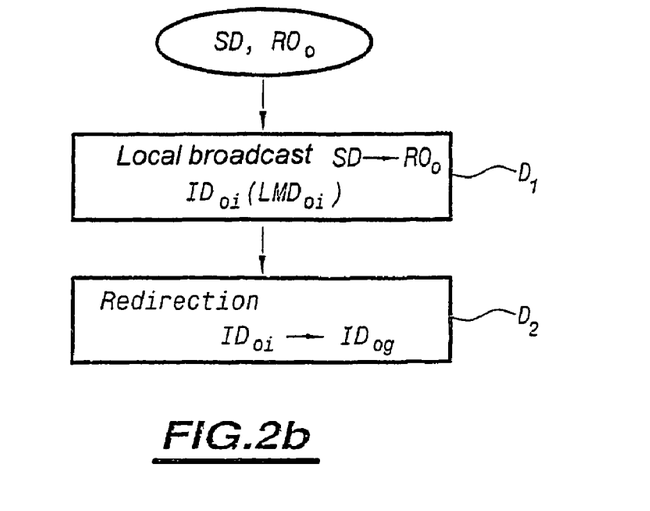
FIG. 2b represents, purely by way of illustration, a specific and non-limiting implementation of the step for transferring the information to be broadcast from the first local broadcasting address to the second global broadcasting address.

With reference to FIG. 2b, it is indicated that the abovementioned step D can then include a step D1 for the local multicast broadcasting of the information to be broadcast stored at the first address $LMD_{0i}$ from the broadcast server to the router $RO_0$.

The abovementioned step D1 is followed by a step D2 consisting of a step for redirecting the information to be broadcast $ID_{0i}$ by substituting the second global multicast broadcasting address $GMD_{0g}$ for the first local broadcasting address $LMD_{0i}$. It will be understood in particular that this redirection step D2 can consist simply in allocating to the information broadcast locally $ID_{0i}$ the second global multicast broadcasting address to in fact generate the data stored at the second broadcasting address, denoted $ID_{0g}$.

It will be understood, in particular, that the abovementioned redirection step can simply consist in associating with the stored data supporting the information to be broadcast, stored on the router $RO_0$, a simple data structure comprising the first and the second addresses, the data structure possibly consisting simply of a list containing at least the first and the second abovementioned addresses or any equivalent data structure.

Given the way the method that is the subject of the present invention works as described in FIGS. 2a to 2b, it is indicated that, for a plurality of extended multicast broadcast request messages, relating to one and the same first local multicast broadcasting address, emanating from a plurality of roaming terminals belonging to the originating site and each interconnected to the IP network on a different separate site, the step E consisting in transmitting by global multicast broadcast the information to be broadcast under the second address is then used to create a global multicast broadcast tree, the root element of which is formed by one of the routers common to the broadcast branches that make up the abovementioned global multicast broadcast tree.

However, a specific embodiment of the method that is the subject of the present invention will now be described in conjunction with FIG. 2c, this embodiment appearing particularly advantageous for providing a consistent management of the local (or global) multicast information broadcast types and of the memory space ultimately occupied to this end, both on the broadcast server SD and on the router $RO_0$.

According to a particularly advantageous embodiment of the method that is the subject of the invention, the second global multicast broadcasting address $GMD_{0g}$ is maintained and validated for a local multicast information broadcast $LMD_{0i}$ at the first address permanently. The concept of permanent information broadcast originates from the fact that the global address is maintained as long as there are external subscribers.

In these conditions, it will be understood that to provide the permanent maintenance and validation of the second global multicast information broadcasting address $GMD_{0g}$, the data structure, such as a list $[LMD_{0i}, GM_{0g}]$, is stored and secured permanently on the router, the first and the second addresses thus being correlated on a one-to-one basis permanently.

In these conditions, the step D consisting in transferring information to be broadcast from the first to the second broadcasting address can then be eliminated for any extended multicast broadcast request message to this second address, following the first extended IP multicast broadcast request message to the abovementioned second address.

It will be understood in particular that the concept of eliminating the step D simply concerns the elimination of the physical transfer of the data stored at the first address to the second address, this physical transfer then capable of being simply replaced by calling the second global multicast information broadcasting address based on the previously mentioned permanent data structure.

Figure 2C:
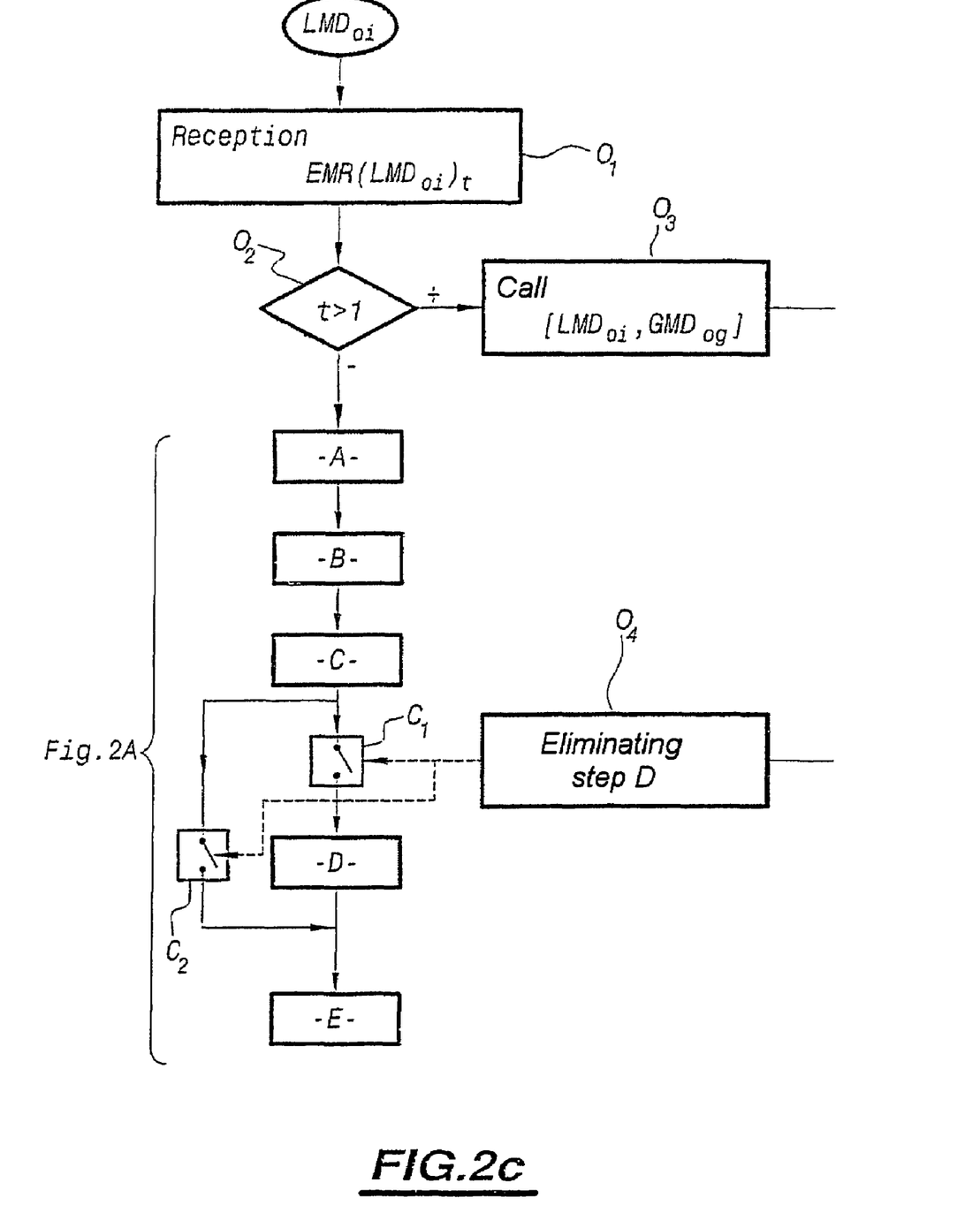
FIG. 2c represents, purely by way of illustration, a preferred and non-limiting implementation of the method that is the subject of the present invention for a number of extended IP multicast information broadcast request messages greater than one and relating to one and the same local multicast information broadcast from one and the same originating site.

A flow diagram illustrating a corresponding procedure is represented in FIG. 2c.

With reference to the abovementioned figure, the abovementioned procedure can include, prior to the implementation of the steps A, B, C, D and E of FIG. 2a, a step $O_1$ for receiving any extended multicast broadcast request message EMR $(LMD_{0i})$ and counting these messages, a counting index t being assigned to each of these successive messages in a step $O_1$. The abovementioned step $O_1$ is followed by a step $O_2$ for comparing the counting indices with the value 1.

On a negative response to the test step $O_2$, the method that is the subject of the present invention as represented in FIG. 2a is then conducted unchanged.

Otherwise, on a positive response to the test $O_2$, for any extended multicast broadcast request message to the second address, subsequent to the abovementioned first message, a procedure for calling the permanent data structure in step $O_3$ is carried out to order a step $O_4$ for eliminating the step D.

The elimination step can then be represented, as is illustrated in FIG. 2c, by invoking logical switches $C_1$ and $C_2$, to eliminate the invocation of the step D and, on the contrary, to activate the invocation of the step E directly from the step C and, naturally, of the data and information stored at the first address redirected via the permanent data structure to the second global multicast broadcasting address.

A more detailed description of the structure of the messages implemented by the method that is the subject of the present invention will now be given in conjunction with FIGS. 3a to 3c.

Figure 3A:
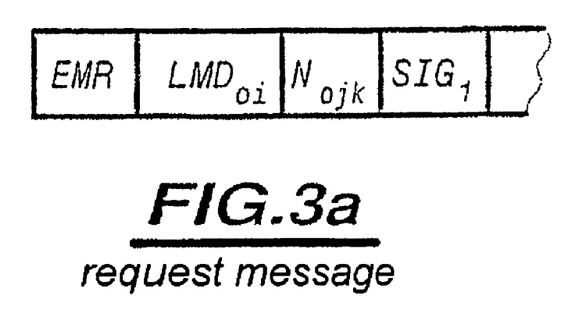
FIGS. 3a to 3c represent, purely by way of illustration, an example of the structure respectively of the information broadcast request, information broadcast access offer and extended multicast access offer acceptance messages.

FIG. 3a represents a non-limiting data structure representative of an extended multicast information broadcast request message.

As an example, the request message can include a header field containing an extended multicast information broadcast request message EMR identification code, a field containing the first local multicast information broadcasting address $LMD_{0i}$ and a field containing an identification code of the roaming terminal $N_{0jk}$.

On receipt of the request message by the originating site, the latter is then able to proceed, on the basis of the address references 0, j and k of the roaming terminal identification code, to verify the fact that the latter belongs to the originating site of index 0, to identify as such an identification code represented by the index j and to store the address of the separate site $S_k$.

Figure 3B:
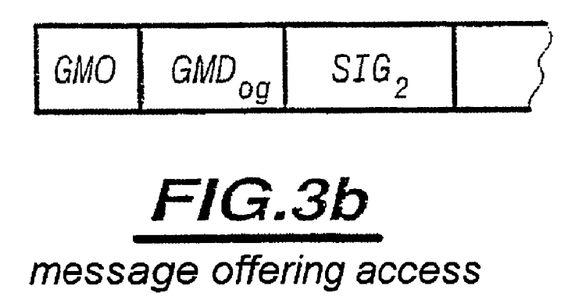

FIG. 3b represents, by way of nonlimiting example, a structure of a message offering access GMO $(GMD_{0g})$ to a global multicast information broadcast transmitted by the originating site $S_0$ to the abovementioned roaming terminal.

As is represented in FIG. 3b, this message can include a header field containing a code identifying access offer messages GMO, a second global multicast information broadcasting address $GMD_{0g}$, the indices 0 and g being used to identify the broadcasting source in the originating site. When the message offering access is received by the roaming terminal, the latter is able to identify the broadcasting source corresponding to the information requested by the request message at the local multicast information broadcasting address under the second global multicast information broadcasting address.

Figure 3C:
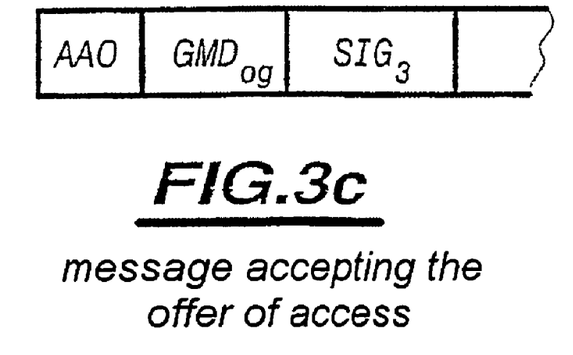

Finally, FIG. 3c represents, in a non-limiting way, the structure of a message accepting the offer of access.

This message can include a header field containing a code identifying access offer acceptance messages AAO, a field containing the second global multicast information broadcasting address, the presence of this information in the access offer acceptance message, that is, the second global multicast information broadcasting address, possibly corresponding to an actual acceptance by the user of the roaming terminal of the proposed access offer.

With reference to FIGS. 3a, 3b and 3c, it is indicated that, preferably but in a non-limiting way, other fields can be added to the message structures. In particular, as is represented in the above-mentioned figures, a data signature field SIG1, SIG2 and SIG3 can be added to the abovementioned message structure.

In a specific and non-limiting way, it is indicated that the fields of the abovementioned messages can preferably be transmitted encrypted without departing from the context of the method that is the subject of the present invention.

When the data fields that make up the structure of the abovementioned messages are encrypted and a signature data field is provided, those involved in implementing the method that is the subject of the invention, that is the originating site and the roaming terminal concerned, can then proceed on the one hand to authenticate the data transmitted via the abovementioned messages by verifying the signatures and to securely transmit the data using the encryption/decryption process.

These operations will not be described in detail because they can be implemented on the basis of any encryption/decryption, signature/verification method that is known per se.

A more detailed description of an extended multicast information broadcasting system according to the subject of the present invention will now be given in conjunction with FIGS. 4a to 4c.

Figure 4A:
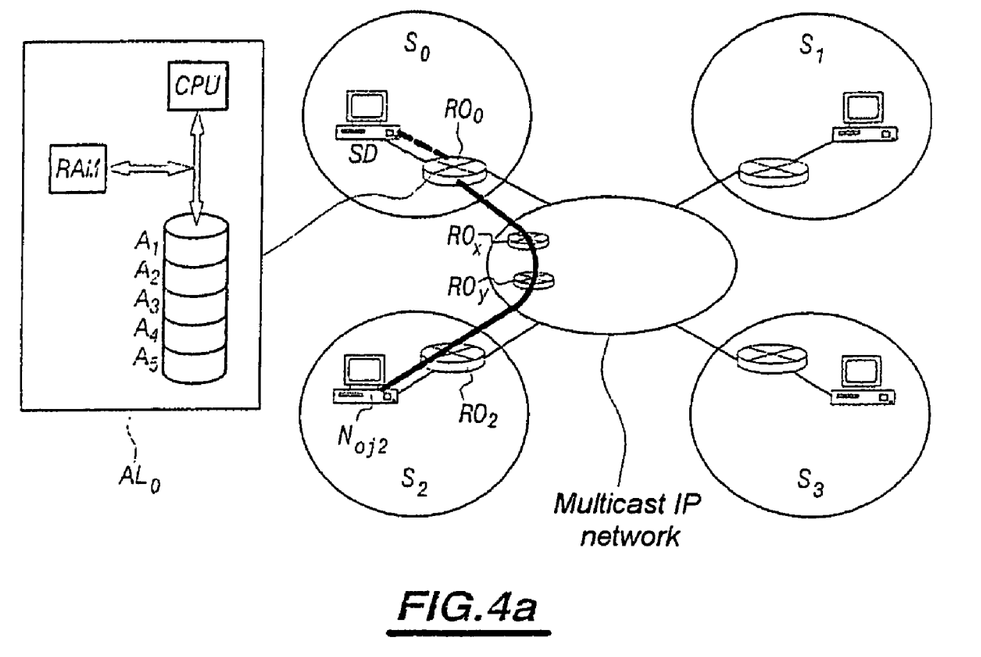
FIGS. 4a, 4b and 4c represent, purely by way of illustration, an extended multicast information broadcasting system, in accordance with the subject of the present invention, according to a plurality of successive situations corresponding to the sending of successive extended multicast information broadcast request messages from one or more roaming terminals from different sites of a multi-site business.

FIG. 4a shows a representation of a multi-site entity or business comprising four sites, an originating site denoted $S_0$ and three separate sites denoted $S_1$, $S_2$ and $S_3$. By way of non-limiting example, the originating site $S_0$ is deemed to include a broadcast server SD connected to a router $RO_0$ on the IP network.

Similarly, by way of non-limiting example, the roaming terminal is referenced $N_{0/2}$, in which 2 represents the address of the site $S_2$ hosting this roaming terminal in the example given in FIG. 4a. The local multicast information broadcast is generated by an information broadcasting source located at a first local multicast broadcasting address denoted $LMD_{0i}$ and situated, of course, on the broadcast server SD in the originating site $S_0$. By way of non-limiting example, the roaming terminal $N_{0/2}$ is reputed to be connected on the site $S_2$ via a router $RO_2$ to the IP network.

As is also represented in FIG. 4a, the system that is the subject of the invention includes, at least on the originating site, a module $A_1$ for receiving an extended multicast information broadcast request message, the message EMR (LMD$_{Oi}$) as described previously in the description and represented in FIG. 3a. This message consequently includes the identification code of the roaming terminal, that is, the code N$_{Ojk}$ represented in the abovementioned FIG. 3a.

The module for receiving the broadcast request message EMR (LMD$_{Oi}$) can be used for the identification of the roaming terminal via the originating site. It will be understood in particular that, on receipt of the abovementioned request message, the originating site, based on the data field containing the identification code of the roaming terminal N$_{Ojk}$ can be used, naturally, to identify, by discriminating the indices or address references 0 and j, the identification of the roaming terminal as belonging to the originating site and authorized to run a transaction to access the extended multicast information broadcasting method.

As is also represented in FIG. 4a, the system that is the subject of the invention includes, on the originating site, a module A$_2$ for transmitting from this originating site S$_0$ to the roaming terminal, after the identification of the latter N$_{Oj2}$, the message offering access to a global multicast information broadcast, that is, the message GMO (GMD$_{Og}$). This message is represented according to the structure illustrated in FIG. 3b, for example.

Furthermore, the originating site includes, as is represented in FIG. 4a, a module A$_3$ for receiving the message accepting the offer of access to the information being broadcast at the second global multicast information broadcasting address, transmitted by the roaming terminal N$_{Oj2}$. This message is, for example, as represented in FIG. 3c.

The originating site S$_0$ further includes a module A$_4$ for transferring the information to be broadcast from the first to the second broadcasting address.

It will be understood in particular that the abovementioned module A$_4$ can be used, for example, to execute the abovementioned transfer in accordance with FIG. 2b and/or in accordance with FIG. 2c, given the rank of the request message received relative to the first extended multicast information broadcast request message received.

Finally, the originating system S$_0$ advantageously includes a module for transmitting, by global multicast information broadcast, information to be broadcast to the second address, that is, the address GMD$_{Og}$ for the data ID$_{Og}$ transmitted by global multicast information broadcast.

Figure 4B:
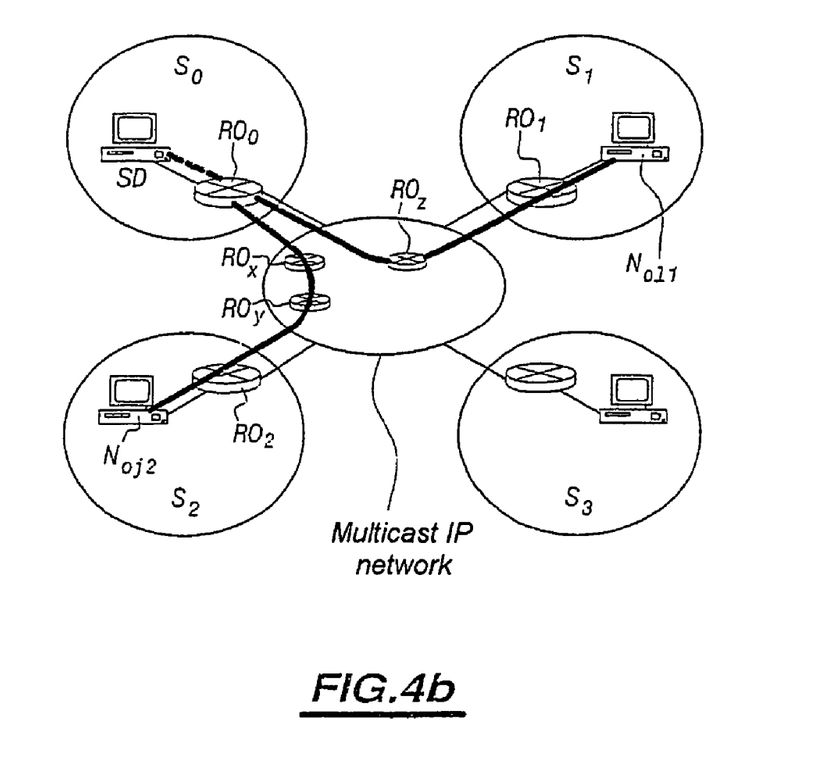
Figure 4C:
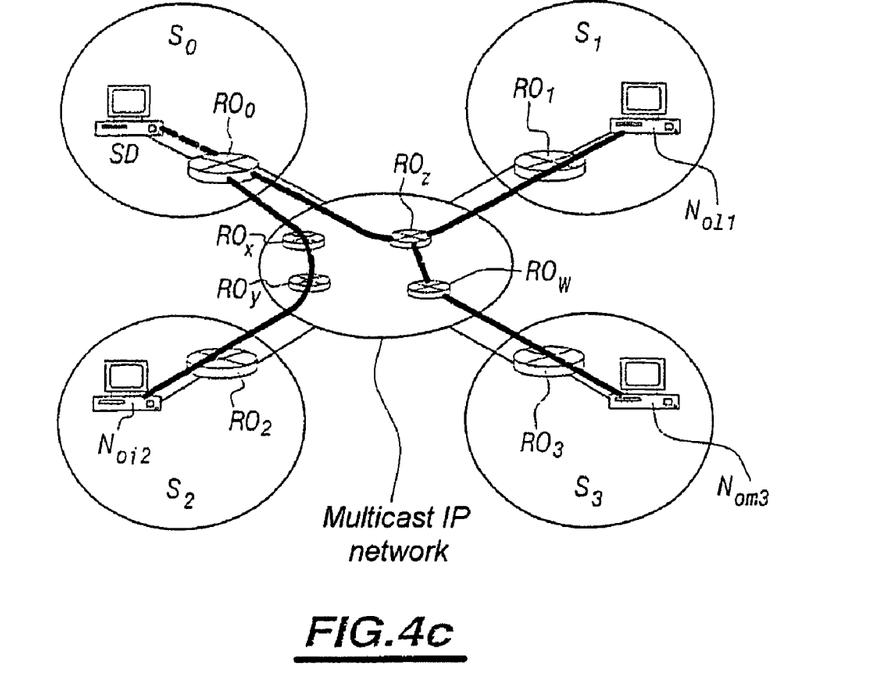

In the embodiment of the system that is the subject of the invention as represented in FIGS. 4a to 4c, consideration is given to a non-limiting exemplary embodiment in which the originating site S$_0$ includes the broadcast server SD connected to the IP network via the router RO$_0$.

In this situation, the module for receiving the multicast information broadcast message, module A$_1$, the module for transmitting the message offering access A$_2$, the module for receiving the acceptance message A$_3$, the module for transferring the information to be broadcast from the first to the second broadcasting address A$_4$, and finally, the module for transmitting by global multicast information broadcast A$_5$ information to be broadcast under the second address, are formed by software modules located in the router RO$_0$, this router naturally being provided with appropriate input/output devices dedicated to the transmission and reception of messages according to the IP method over the IP network.

It will be understood in particular that the router RO$_0$ being provided with a computation unit CPU and a random access memory RAM, the set of modules A$_1$ to A$_5$ of software type can be stored in a mass memory of the router, loaded into the RAM type working memory and configured as a software agent for implementing the steps of the method that is the subject of the invention as represented in FIGS. 2a to 2c.

When, according to a second non-limiting embodiment of the system that is the subject of the invention on the originating site S$_0$, the broadcast server SD is formed by a dedicated machine, the latter is connected to the IP network in the absence of a router via a network card, for example.

A more detailed description of a roaming terminal equipped to implement the extended multicast information broadcasting method, in accordance with the subject of the present invention, such as the roaming terminal N$_{Oj2}$ on the site S$_2$ of the FIG. 4a, will be provided prior to a description of the procedure of the system that is the subject of the invention with reference to the FIGS. 4a to 4c.

Figure 5:
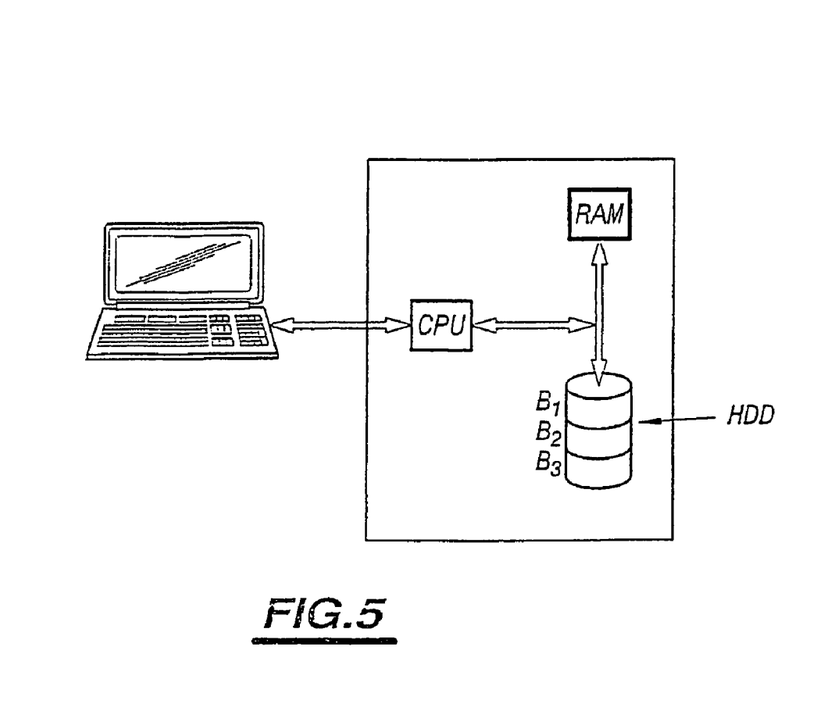
FIG. 5 represents, by way of illustration, an example of implementation of a roaming terminal according to a non-limiting embodiment.

The roaming terminal such as the terminal N$_{Oj2}$ in the FIG. 4a includes at least, stored in the mass memory of the latter, as represented in FIG. 5, a software module B1 for creating and transmitting an extended multicast information broadcast request message, that is, the message EMR (LMD$_{Oi}$) represented in FIG. 3a, a software module B$_2$ for receiving and reading the message offering access GMO (GMD$_{Og}$) as represented for example in FIG. 3b, and, finally, a software module B$_3$ for creating and transmitting to the originating site S$_0$, via the IP network, the message AAO accepting the offer of access to the information being broadcast at the second global multicast information broadcasting address as represented in FIG. 3c.

Of course, the roaming terminal includes a computation unit CPU and a RAM type random access memory. The abovementioned software modules can then be loaded into the random access memory RAM to execute the message invocation and interpretation functions, as described previously in the description in conjunction with FIGS. 2a to 2c.

FIG. 5 shows a non-limiting exemplary representation of the roaming terminal as formed by a laptop computer, for example.

Of course, in addition to the abovementioned software modules B$_1$, B$_2$ and B$_3$, the roaming terminal includes any input/output and network connection system such that the roaming terminal, such as the terminal N$_{Oj2}$ represented in FIG. 4a on the site S$_2$, is connected to the IP network via a router RO$_2$. The existence of a router is not essential, but corresponds to most of the situations commonly encountered.

Finally, although the roaming terminal is represented in FIG. 5 in the form of a laptop computer, this roaming terminal can in fact be any terminal, such as a pocket PC or other, provided with sufficient resources.

Furthermore, the concept of roaming terminal advantageously covers the use of any fixed terminal provided with a code for accessing the extended multicast information broadcasting services, this code being, for example, temporary and managed by the broadcast server SD located on the originating site S$_0$.

The way the system as represented in FIG. 4a works is then as follows with reference to FIGS. 4a, 4b and 4c:

The roaming terminal N$_{Oj2}$ is, for example, visiting on the site S$_2$ and wants to have access and, for example, subscribe to the local broadcast on the originating site S$_0$, the address of which is LMD$_{Oi}$.

The roaming terminal N$_{Oj2}$ which has in mass memory, for example, the local multicast broadcasting address LMD$_{Oi}$, detects that it is a broadcast restricted to the originating site S$_0$.

The abovementioned roaming terminal then proceeds to send an extended multicast information broadcast request message to the software agent AL$_0$ located on the router RO$_0$ of the originating site S$_0$, instead of sending a conventional type IGMP subscription message. This request message is the one sent in the step A of FIG. 2a. The software agent $AL_0$ is, for example, formed by the abovementioned software modules $A_1$ to $A_5$ run via the RAM memory and the computation unit CPU represented in FIG. 4a.

The software agent $AL_0$ of the originating site $S_0$ receives the abovementioned request message. After the identification of the roaming terminal, as described previously in the description, the originating site $S_0$, via the abovementioned software agent, transmits the access or subscription offer message GMO ($GMD_{0g}$). This subscription offer message indicates in fact to the roaming terminal that, to receive the broadcast restricted to the originating site $S_0$ on the separate site $S_2$, the roaming terminal must accept the offer and subscribe in fact to the global multicast broadcast, the address of which is the second address $GMD_{0g}$.

In fact, with reference to the provisions of the standard RFC 2236, it is indicated that the second abovementioned global multicast information broadcasting address is an address corresponding to a global multicast broadcast or restricted to the organization for which the access router on the originating site $S_0$ is identified as being the source.

When the roaming terminal $N_{0/2}$ receives the message offering access, it normally accepts the access offer or subscribes to the information broadcast at the second global multicast information broadcasting address by sending the acceptance message AAO to its access router, the router $RO_2$ represented on the site $S_2$ of FIG. 4a.

This access acceptance or subscription message is then propagated through the IP network in point-to-point mode as mentioned previously in the description.

When the extended multicast information broadcast request message for the broadcast data at the local multicast information broadcasting address concerned is the first of these request messages, the negative alternative of the comparison test $O_2$ in FIG. 2c, for example, the access router on the originating site $S_0$ itself accesses or subscribes to the local broadcast at the address $LMD_{0i}$ restricted to the originating site $S_0$, in order, of course, to receive its data or information $ID_{0i}$. After receipt of the message accepting access to the global multicast information broadcast at the second address $GMD_{0g}$, the access router $RO_0$ of the originating site $S_0$ proceeds via the software agent and, in particular, via the software module $A_4$, with the operation to redirect this information and corresponding data according to the step $D_2$ in FIG. 2b. The operation to transmit global multicast data and information in accordance with the step E of FIG. 2a or 2c by the originating site $S_0$, and in particular by the software module $A_5$ located in the router $RO_0$, to the roaming terminal $N_{0/2}$, is then carried out. The abovementioned roaming terminal visiting on the site $S_2$ then receives the data of the local broadcast from the first address via the global broadcast at the second address.

The configuration of the system that is the subject of the networked invention is then that represented in FIG. 4a, the branch of the multicast broadcast tree being represented by the access router $RO_0$ of the originating site $S_0$, an intermediate router ROx of the interconnecting multicast IP network and another intermediate router ROy of this same interconnecting multicast IP network, which is linked to the access router $RO_2$ of the roaming terminal and of the separate site $S_2$.

With reference to FIG. 4b, consideration is now given either to the same roaming terminal of identification index or code j, or another roaming terminal of identification index or code 1, but belonging to the same originating site $S_0$ visiting on the separate site $S_1$.

For the purposes of the description, another roaming terminal of specific identification code or index 1 is considered, that wants to access or subscribe to the same local broadcast of the originating site $S_0$ and of the same address $LMD_{0i}$.

As in the case of the roaming terminal $N_{0/2}$, the other roaming terminal $N_{011}$ detects that it is a broadcast restricted to the originating site $S_0$.

The other roaming terminal transmits an extended multicast broadcast request message to the software agent located on the access router $RO_0$ of the originating site $S_0$.

This message indicates the address $LMD_{0i}$ of the broadcast concerned.

The software agent located on the router $RO_0$ of the originating site receives the abovementioned extended multicast information broadcast request message and, after the identification of the other roaming terminal, transmits the access or subscription offer message GMO ($GMD_{0g}$).

Since the extended multicast information broadcast is already in progress, no other action is undertaken by the access router $RO_0$ of the originating site $S_0$. In practice, with reference to FIG. 2c and in which t>1, that is to say, the positive alternative of the comparison operation $O_2$, the rank of the extended multicast information broadcast request message being greater than 1, the simple invocation of the permanent data structure in the step $O_3$ is then used to invoke the step $O_4$ to eliminate the step D. The method that is the subject of the invention, as represented in FIG. 2c, can then be used, via logical switches $C_1$ and $C_2$, to go direct from the step D to the step E.

When the roaming terminal $N_{011}$ receives the message offering access, it responds with the access or subscription offer acceptance message at the second broadcasting address by sending the acceptance message AAO in the form of IGMP subscription to the access router $RO_1$ of the separate site $S_1$. Since the global multicast information broadcast at the second broadcasting address is already in progress in the IP network, in particular on the intermediate router $RO_x$, a new branch of the broadcast tree is thus created, which consists, by way of non-limiting example, in the interconnection of the intermediate router $RO_x$ and of a router $RO_z$ in turn connected to the access router $RO_1$ of the separate site $S_1$.

The roaming terminal $N_{011}$ thus receives the data of the local broadcast at the address $LMD_{0i}$ via the global broadcast at the second address $GMD_{0g}$.

The state of the networked system that is the subject of the invention is as represented in FIG. 4b.

Finally, one of these roaming terminals or another different roaming terminal of identification index or code m proceeds, as represented in FIG. 4c, to transmit an extended multicast information broadcast request from the separate site $S_3$, for example; the process is similar to that described in relation to the separate site $S_1$, the step D of the figure or of the FIG. 2c still being eliminated. The networked system that is the subject of the invention in this situation corresponds to that represented in FIG. 4c, the broadcast tree further including an additional branch made up of the intermediate router $RO_z$ and $RO_w$ of the IP network, for example, connected to router $RO_3$ of the separate site $S_3$.

It will thus be understood, from looking at FIGS. 4a to 4c, that the system that is the subject of the invention allows for an extended multicast type information broadcast from the broadcasting source SD to the final receiver without any use of unicast type tunnels or even the systematic duplication of the data.

Thus, for each broadcast that is the subject of an extended multicast information broadcast request, in accordance with the subject of the present invention, from a roaming terminal, the method that is the subject of the invention is used to generate the creation of a multicast broadcast tree on the interconnecting IP network.

Although the security aspect of access control and of access to the broadcast information such as the process for identifying each roaming terminal, encrypting data and authenticating data are not a subject of the present invention, it is indicated that the abovementioned data identification, authentication and encryption processes can be used to implement a particularly advantageous extended multicast data broadcast method.

Finally, the invention relates, naturally, to any software product stored on a storage medium for the implementation, by a computer such as a roaming terminal, for example, of the extended multicast information broadcasting method described previously in the description based on a local multicast broadcast on an originating site to at least one separate site hosting this roaming terminal and linked to this originating site by the IP network.

Since the local multicast information broadcast is generated by an information broadcasting source located at a first local multicast information broadcasting address in the originating site, the software product includes, for invocation on the roaming terminal, the software module $B_1$ for creating and transmitting an extended multicast information broadcast request message. This request message naturally contains at least the first local multicast information broadcasting address $LMD_{0i}$ and an identification code of the roaming terminal concerned $N_{0jk}$, a software module $B_2$ for receiving and reading the message offering access to a global multicast information broadcast, message GMO ($GMD_{0g}$) including at least the second global multicast information broadcasting address $GMD_{0g}$, the broadcasting source of which is identified in the originating site, and a software module $B_3$ for creating and transmitting to the originating site $S_0$ the message accepting the offer of access AAO to the information being broadcast at the second global multicast information broadcasting address $GMD_{0g}$.

The invention also relates to a software product stored on a storage medium for the implementation, by a computer, of the multicast information broadcasting method extended from a local multicast broadcast on an originating site $S_0$ to at least one separate site $S_k$ hosting this roaming terminal and linked to this originating site by the IP network. The software product includes, for invocation on the originating site $S_0$, a software module $A_1$ for receiving the extended multicast information broadcast request message sent by the roaming terminal from the separate site, this software module $A_1$ being used for the identification on the separate site of the roaming terminal by the originating site via address indices or references 0, j and k assigned to the identification codes of the roaming terminal, a software module $A_2$ for transmitting from the originating site to the roaming terminal a message offering access to the global information multicast broadcast. This message offering access includes at least the second global multicast information broadcasting address $GMD_{0g}$, the broadcasting source of which is identified in the originating site, a software module $B_3$ for receiving the message accepting the offer of access to the information being broadcast at the second global multicast information broadcasting address sent by the roaming terminal, a software module $B_4$ for transferring the information to be broadcast from the first to the second broadcasting address, this software module $B_4$ possibly being simply to create the permanent data structure previously mentioned in the description and, of course, redirect the information to be broadcast from the first to the second address with these addresses in a one-to-one correlation, a software module $A_5$ for transmitting by global multicast information broadcast the information to be broadcast to the abovementioned second address.

The invention claimed is:

1. A multicast information broadcasting method extended from a local multicast information broadcast on an originating site to a roaming terminal user belonging to this originating site, to at least one separate site hosting this roaming terminal and linked to this originating site by the IP network, the local multicast information broadcast being generated by an information broadcasting source located at a first local multicast information broadcasting address in this originating site, upon interconnecting said roaming terminal to the IP network on this separate site, the method comprising:

a) transmitting, from the roaming terminal to the originating site, an extended multicast information broadcast request message, said request message containing at least said first local multicast information broadcasting address and an identification code of said roaming terminal; and, following the identification of said roaming terminal by said originating site,
   b) transmitting, from the originating site to said roaming terminal, a message offering access to a global multicast information broadcast, said message offering access including at least one second global multicast information broadcasting address, the broadcasting source of which is identified in the originating site; and, following the receipt of said message offering access by said roaming terminal,
   c) transmitting from the roaming terminal to the originating site, via the IP network, a message accepting the offer of access to the information being broadcast at said second global multicast information broadcasting address; and, after receipt of the message accepting the offer of access on said originating site,
   d) transferring the information to be broadcast from the first to the second broadcasting address; and
   e) transmitting, by global multicast broadcast, the information to be broadcast under the second address, which enables said roaming terminal interconnected to the separate site to receive, on the separate site, the information being broadcast under the first local broadcasting address, broadcast under the second global broadcasting address.

2. The method as claimed in claim 1, wherein the steps a), b) and c) for transmission between the roaming terminal and the originating site, of the extended multicast broadcast request message, of the message offering access to a global multicast broadcast, or of the message accepting the offer of access are executed in point-to-point mode.

3. The method as claimed in claim 1, wherein the step e) for global multicast transmission is performed in point-multipoint mode.

4. The method as claimed in claim 1, wherein, for an originating site including a broadcast server connected to the IP network via a router, the step of transferring the information to be broadcast from the first to the second broadcasting address further comprises:
   a step for local multicast broadcasting of the information to be broadcast from the broadcast server to said router;
   a step for redirecting the information to be broadcast by substituting the second global multicast broadcasting address for the first local broadcasting address.

5. The method as claimed in claim 1, wherein, for a plurality of extended multicast broadcast request messages relating to one and the same first local multicast broadcasting address emanating from a plurality of roaming terminals belonging to said originating site and each interconnected to the IP network on a separate site, said step e), of transmitting, by global multicast broadcast, the information to be broadcast under the second address creating a global multicast broadcast tree, the root element of which being one of the routers common to the broadcast branches making up this global multicast broadcast tree.

6. The method as claimed in claim 1, wherein, said second address being maintained and validated for a local multicast information broadcast to said first address, said step d) transferring the information to be broadcast from the first to the second broadcasting address is deleted for any extended multicast broadcast request message to this second address following the first extended multicast broadcast request message to said second address.

7. A multicast information broadcasting system extended, from a local multicast broadcast on an originating site to a roaming workstation user belonging to this originating site, to at least one separate site hosting this roaming terminal and linked to this originating site by the IP network, the local multicast information broadcast being generated by an information broadcasting source located at a first local multicast broadcasting address in this originating site, said system at said originating site comprising:
- a means of receiving an extended multicast information broadcast request message, sent by said roaming terminal from said separate site, said request message containing at least said first local multicast information broadcasting address and an identification code of said roaming terminal, said reception means being used for the identification of said roaming terminal by the originating site;
- a means of transmitting, from the originating site to the roaming terminal, a message offering access to a global multicast information broadcast, said message offering access including at least one second global multicast information broadcasting address, the broadcasting source of which is identified in the originating site;
- a means of receiving a message accepting the offer of access to the information being broadcast at said second global multicast information broadcasting address, sent by said roaming terminal;
- a means of transferring the information to be broadcast from the first to the second broadcasting address;
- a means of transmission, by global multicast information broadcast, of the information to be broadcast under the second address.

8. The system as claimed in claim 7, wherein said means of receiving an extended multicast broadcast request message, of transmitting, from the originating site to the roaming terminal, a message offering access to a global multicast broadcast, of receiving a message accepting the offer of access to the information being broadcast at said second global multicast broadcasting address, of transferring the information to be broadcast from the first to the second broadcasting address, of transmitting, by global multicast broadcast, the information to be broadcast under the second address, are formed by software modules.

9. The system as claimed in claim 8, wherein said software modules are located on a dedicated machine interconnected by IP local area network on the originating site.

10. The system as claimed in claim 8, wherein, said originating site including a broadcast server connected to the IP network via a router, said software modules are located in said router.

11. A roaming terminal equipped to implement the multicast information broadcasting method extended, from a local multicast information broadcast on an originating site, to which this roaming terminal belongs, to at least one separate site hosting this roaming terminal and linked to this originating site by the IP network, the local multicast information broadcast being generated by an information broadcasting source located at a first local multicast information broadcasting address in this originating site, said roaming terminal stored in the mass memory of the latter comprising:
- a software module for creating and transmitting an extended multicast information broadcast request message, this request message containing at least one first local multicast information broadcasting address and an identification code of this roaming terminal;
- a software module for receiving and reading a message offering access to a global multicast information broadcast, this message offering access including at least one second global multicast information broadcasting address, the broadcasting source of which is identified in the originating site;
- a software module for creating and transmitting to the originating site, via the IP network, a message accepting the offer of access to the information being broadcast at said second global multicast information broadcasting address.

12. A computer readable recording medium with a data structure stored thereon, the data structure comprising:
- an extended multicast information broadcast request message, exchanged in the context of a multicast information broadcasting method extended, from a local multicast broadcast on an originating site to a roaming terminal user belonging to this originating site, to at least one separate site hosting this roaming terminal and linked to this originating site by the IP network, the local multicast information broadcast being generated by an information broadcasting source located at a first local multicast information broadcasting address in this originating site,
- wherein said extended multicast information broadcast request message is transmitted from the roaming terminal to the originating site
- and in that said data structure includes at least:
  - a header field containing an extended multicast information broadcast request message identification code;
  - a field containing the first local multicast information broadcasting address;
  - a field containing an identification code of the roaming terminal.

13. A computer readable storage medium with a data structure stored thereon, the data structure comprising:
- a message offering access to a global multicast information broadcast, exchanged in the context of a multicast information broadcasting method extended, from a local multicast broadcast on an originating site to a roaming terminal user belonging to this originating site, to at least one separate site hosting this roaming terminal and linked to this originating site by the IP network, the local multicast information broadcast being generated by an information broadcasting source located at a first local multicast information broadcasting address in this originating site,
- wherein said message offering access to a global multicast information broadcast is transmitted from the originating site to said roaming terminal,
- and in that said data structure includes at least:
  - a header field containing an access offer message identification code;

a field containing a second global multicast information broadcasting address, under which should be broadcast the information being broadcast under the first local broadcasting address.

14. A computer readable storage medium with a data structure thereon, the data structure comprising a message accepting the offer of access to a global multicast information broadcast, exchanged in the context of a multicast information broadcasting method extended, from a local multicast broadcast on an originating site to a roaming terminal user belonging to this originating site, to at least one separate site hosting this roaming terminal and linked to this originating site by the IP network, the local multicast information broadcast being generated by an information broadcasting source located at a first local multicast information broadcasting address in this originating site, wherein said message accepting the offer of access to a global multicast information broadcast is transmitted from the roaming terminal to said originating site, and in that said data structure includes:
- a header field containing an access offer acceptance message identification code;
- a field containing a second global multicast information broadcasting address, under which should be broadcast the information being broadcast under the first local broadcasting address.

15. A computer readable recording medium encoded with a computer program thereon that when executed performs as broadcasting method extended from a local multicast information broadcast on an originating site to a roaming terminal user belonging to this originating site, to at least one separate site hosting this roaming terminal and linked to this originating site by the IP network, the local multicast information broadcast being generated by an information broadcasting source located at a first local multicast information broadcasting address in this originating site, upon interconnecting said roaming terminal to the IP network on this separate site, the method comprising:

a) transmitting, from the roaming terminal to the originating site, an extended multicast information broadcast request message, said request message containing at least said first local multicast information broadcasting address and an identification code of said roaming terminal; and, following the identification of said roaming terminal by said originating site, b) transmitting, from the originating site to said roaming terminal, a message offering access to a global multicast information broadcast, said message offering access including at least one second global multicast information broadcasting address, the broadcasting source of which is identified in the originating site; and, following the receipt of said message offering access by said roaming terminal, c) transmitting from the roaming terminal to the originating site, via the IP network, a message accepting the offer of access to the information being broadcast at said second global multicast information broadcasting address; and, after receipt of the message accepting the offer of access on said originating site, d) transferring the information to be broadcast from the first to the second broadcasting address; and e) transmitting, by global multicast broadcast, the information to be broadcast under the second address, which enables said roaming terminal interconnected to the separate site to receive, on the separate site, the information being broadcast under the first local broadcasting address, broadcast under the second global broadcasting address.

16. The computer readable recording medium according to claim 15, when executed on said roaming terminal further comprising:

creating and transmitting an extended IP multicast information broadcast request message, this request message containing at least a first local multicast information broadcasting address and an identification code of this roaming terminal;

receiving and reading a message offering access to a global multicast information broadcast, this message offering access including at least one second global multicast information broadcasting address, the broadcasting source of which is identified in the originating site;

creating and transmitting to the originating site, via the IP network, a message accepting the offer of access to the information being broadcast at said second global multicast information broadcasting address.

17. The computer readable recording medium according to claim 15, when executed on said originating site further comprising:

receiving an extended IP multicast information broadcast request message sent by the roaming terminal from the separate site, this request message including at least the first local multicast information broadcasting address and an identification code of said roaming terminal, said receiving software module being used for the identification on the separate site of said roaming terminal by the originating site;

transmitting from the originating site, to the roaming terminal, a message offering access to a global multicast information broadcast, said message offering access including at least one second global multicast information broadcasting address, the broadcasting source of which is identified in the originating site;

receiving a message accepting the offer of access to the information being broadcast at said second global multicast information broadcasting address, sent by said roaming terminal;

transferring the information to be broadcast from the first to the second broadcasting address;

transmitting by global multicast information broadcast, the information to be broadcast under said second address.

18. The computer readable recording medium according to claim 17, wherein, for an originating site including a router, said software modules are stored in a mass memory of said router.

* * * * *

UNITED STATES PATENT AND TRADEMARK OFFICE
CERTIFICATE OF CORRECTION

PATENT NO. : 7,643,506 B2 Page 1 of 1
APPLICATION NO. : 10/567751
DATED : January 5, 2010
INVENTOR(S) : Cantenot et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 955 days.

Signed and Sealed this

Twenty-first Day of December, 2010

David J. Kappos
*Director of the United States Patent and Trademark Office*